United States Patent
Shih et al.

(10) Patent No.: US 10,613,377 B2
(45) Date of Patent: Apr. 7, 2020

(54) DISPLAY DEVICE

(71) Applicant: InnoLux Corporation, Miao-Li County (TW)

(72) Inventors: Ming-Chia Shih, Miao-Li County (TW); Cheng-Hsia Kuo, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/102,811

(22) Filed: Aug. 14, 2018

(65) Prior Publication Data

US 2019/0086724 A1 Mar. 21, 2019

(30) Foreign Application Priority Data

Sep. 15, 2017 (CN) .......................... 2017 1 0831834

(51) Int. Cl.
*G02F 1/1335* (2006.01)
*G09G 3/36* (2006.01)
*G02B 5/02* (2006.01)
*G02B 5/30* (2006.01)
*G09G 3/34* (2006.01)
*G02F 1/1347* (2006.01)
*G02F 1/1343* (2006.01)

(52) U.S. Cl.
CPC ..... *G02F 1/133602* (2013.01); *G02B 5/0205* (2013.01); *G02B 5/3025* (2013.01); *G02F 1/13471* (2013.01); *G09G 3/3426* (2013.01); *G09G 3/3607* (2013.01); *G02F 2001/134345* (2013.01); *G09G 2300/023* (2013.01); *G09G 2320/0233* (2013.01); *G09G 2320/0686* (2013.01); *G09G 2360/145* (2013.01)

(58) Field of Classification Search
None
See application file for complete search history.

(56) References Cited

U.S. PATENT DOCUMENTS

2018/0182304 A1* 6/2018 Lee .................... G09G 3/2003
2018/0197490 A1* 7/2018 Guo .......................... G09G 3/36

* cited by examiner

*Primary Examiner* — Duane N Taylor, Jr.
(74) *Attorney, Agent, or Firm* — Bacon & Thomas, PLLC

(57) ABSTRACT

A display device is disclosed, which includes: a backlight module; a first display panel disposed on the backlight module; and a second display panel disposed between the backlight module and the first display panel, wherein the second display panel includes a first zone and a second zone adjacent to the first zone, the first zone includes a first sub-zone, the second zone includes a second sub-zone and a third sub-zone, and the third sub-zone is disposed between the first sub-zone and the second sub-zone, wherein the first sub-zone has a first luminance, the second sub-zone has a second luminance, the third sub-zone has a third luminance, the first luminance, the second luminance and the third luminance are different, and the third luminance is between the first luminance and the second luminance.

20 Claims, 8 Drawing Sheets

DISPLAY DEVICE

CROSS REFERENCE TO RELATED APPLICATION

This application claims the benefits of the Chinese Patent Application Serial Number 201710831834.0, filed on Sep. 15, 2017, the subject matter of which is incorporated herein by reference.

BACKGROUND

1. Field

The present disclosure relates to a display device with high contrast.

2. Description of Related Art

With continual advancements of the display technology, one major trend of the development of display panels is toward compactness, small thicknesses, and light weight. This explains why the mainstream display devices on the market are thin displays such as liquid-crystal displays (LCDs), organic light-emitting diode (OLED) displays, and micro inorganic LED displays. In fact, thin displays have found extensive use in our daily lives, serving nowadays as the typical display devices of mobile phones, laptop computers, cameras, music players, mobile navigation devices, television sets, and so forth.

In the commercial available LCDs, the dark state is adjusted to be darkened by controlling the backlight module. However, even though high contrast can be achieved by controlling the backlight module, this method is difficult to be applied to display device with high resolution.

Therefore, it is desirable to develop a display device with improved display quality.

SUMMARY

An object of the present disclosure is to provide a display device, wherein the luminance change between two adjacent zones with different luminance is progressively increased or decreased in a second display panel. Thus, the border obviousness between two adjacent zones with different luminance during side viewing can be improved.

The display device of the present disclosure comprises: a backlight module; a first display panel disposed on the backlight module; and a second display panel disposed between the backlight module and the first display panel, wherein the second display panel comprises a first zone and a second zone adjacent to the first zone, the first zone comprises a first sub-zone, the second zone comprises a second sub-zone and a third sub-zone, and the third sub-zone is disposed between the first sub-zone and the second sub-zone, wherein the first sub-zone has a first luminance, the second sub-zone has a second luminance, the third sub-zone has a third luminance, the first luminance, the second luminance and the third luminance are different, and the third luminance is between the first luminance and the second luminance.

In the conventional display device with two display panels, when the luminance of the first zone and the luminance of the second zone in the second display panel are different, the first zone has single luminance, and the second zone has another single luminance, and the luminance of the first zone and the second zone is not progressively increased or decreased. Hence, when the luminance difference between the first zone and the second zone is not small, the border between two adjacent zones with different luminance can be easily observed during side viewing. Hence, in the display device of the present disclosure, the third luminance of the third sub-zone disposed between the first sub-zone and the second sub-zone is designed to be between the first luminance of the first sub-zone and the second luminance of the second sub-zone; thus, the luminance difference between the first sub-zone and the second sub-zone can be reduced, and the border between two adjacent zones with different luminance cannot be easily observed during side viewing.

Other novel features of the disclosure will become more apparent from the following detailed description and accompanying drawings.

DETAILED DESCRIPTION OF EMBODIMENT

The following embodiments when read with the accompanying drawings are made to clearly exhibit the above-mentioned and other technical contents, features and/or effects of the present disclosure. Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

Furthermore, the terms recited in the specification and the claims such as "above", "over", or "on" are intended not only directly contact with the other element, but also intended indirectly contact with the other element. Similarly, the terms recited in the specification and the claims such as "below", or "under" are intended not only directly contact with the other element but also intended indirectly contact with the other element.

Moreover, in the present disclosure, the phrase "A is equal to B" or "A is the same as B" means that a difference between A and B is in a range from 0% to 10% (or 0% to 5%) of B.

In addition, the features in different embodiments of the present disclosure can be mixed to form another embodiment.

Figure 1:
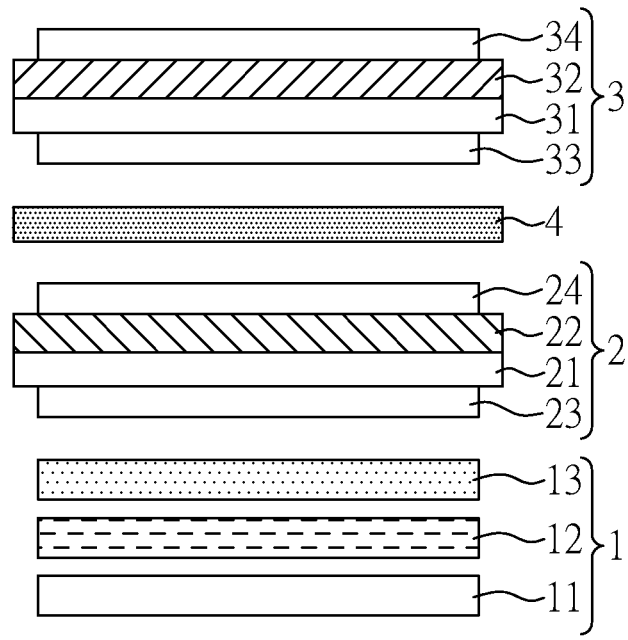
FIG. 1 is a cross-sectional view of a display device according to one embodiment of the present disclosure.

FIG. 1 is a cross-sectional view of a display device according to one embodiment of the present disclosure. The display device of the present embodiment comprise: a backlight module 1; a first display panel 3 disposed on the backlight module 1; and a second display panel 2 disposed between the backlight module 1 and the first display panel 3. In the present embodiment, the backlight module 1 can be a direct-type backlight module or a side-type backlight module. For example, the backlight module 1 of the present embodiment comprises: a light source module 11; a brightness enhancement film 12 disposed on the light source module 11; and an advanced polarization conversion film (APCF) 13 disposed on the brightness enhancement film 12. In other embodiments of the present disclosure, the APCF 13 can be replaced by a dual luminance enhancement film (DBEF). However, the structure of the backlight module suitable for the display device of the present disclosure is not limited thereto. According to the desirable backlight type, in other embodiments of the present disclosure, the backlight module 1 may further comprise other films, such as a light guide plate, a diffusor, a prism, or other optical film.

The display device of the present embodiment comprises two display panels, which are respectively the first display panel 3 and the second display panel 2. In the present embodiment, the first display panel 3 is a color display panel, and the second display panel 2 is a monochromatic gray-scale display panel. The monochromatic gray-scale display panel only shows gray-scale color between black and white colors and shows the changes between the bright and dark states, and no other colors are shown on the monochromatic gray-scale display panel. Herein, the first display panel 3 can be a high resolution display panel. Details of an image displayed on the display device can be maintained due to the high resolution of the first display panel 3. The second display panel 2 is a low resolution display panel, which can be used to adjust the contrast of the display device. The image quality of the display device can be improved and the power consumption thereof can be reduced by using the display device with the aforesaid two display panels.

The second display panel 2 comprises: a first bottom substrate 21; and a first upper substrate 22 disposed on the first bottom substrate 21. Even the figure does not show, a display medium layer is further disposed between the first bottom substrate 21 and the first upper substrate 22 in the second display panel 2. In addition, the first display panel 3 comprises: a second bottom substrate 31; and a second upper substrate 32 disposed on the second bottom substrate 31. Similarly, even the figure does not show, a display medium layer is further disposed between the second bottom substrate 31 and the second upper substrate 32 in the first display panel 3.

In the present embodiment, the first bottom substrate 21 and the second bottom substrate 31 can respectively be: a transistor substrate in which plural transistors (TFT) are disposed on the substrate; a color filter on array (COA) substrate in which plural transistors and a color filter layer are disposed on the substrate; or a black matrix on array (BOA) substrate in which plural transistors and a black matrix layer are disposed on the substrate. When the first bottom substrate 21 or the second bottom substrate 31 is a transistor substrate, the first upper substrate 22 or the second upper substrate 32 can be a substrate with a color filter layer and a black matrix layer disposed thereon. When the first bottom substrate 21 or the second bottom substrate 31 is a COA substrate, the first upper substrate 22 or the second upper substrate 32 can be a substrate with a black matrix layer disposed thereon. When the first bottom substrate 21 or the second bottom substrate 31 is a BOA substrate, the first upper substrate 22 or the second upper substrate 32 can be a substrate with a color filter layer disposed thereon. However, the present disclosure is not limited thereto.

In addition, in the present embodiment, the display medium layer disposed between the first bottom substrate 21 and the first upper substrate 22 or the display medium layer disposed between the second bottom substrate 31 and the second upper substrate 32 can comprise any non-self luminous display medium, such as liquid crystals (LCs), quantum dots (QDs), fluorescence molecules, phosphors or the like.

Furthermore, in the present embodiment, the first bottom substrate 21, the first upper substrate 22, the second bottom substrate 31 and the second upper substrate 32 can be a glass substrate, a plastic substrate, other flexible substrate or a film. When the first bottom substrate 21, the first upper substrate 22, the second bottom substrate 31 and the second upper substrate 32 are plastic substrates, other flexible substrates or films, the display device of the present embodiment can be a flexible display device.

In the display device of the present embodiment, the first display panel 3 further comprises polarizers 33, 34, respectively disposed on the second upper substrate 32 and under the second bottom substrate 31. Similarly, the second display panel 2 may further comprise a first polarizer 23 disposed under the first bottom substrate 21, so the first polarizer 23 is disposed on a side of the second display panel 2 facing to the backlight module 1. Furthermore, the second display panel 2 may further comprises a second polarizer 24 disposed on the first upper substrate 22, so the second polarizer 24 is disposed on a side of the second display panel 2 facing to the first display panel 3. When the second display panel 2 is equipped with the second polarizer 24, the display quality of the display device can further be improved. However, in other embodiments of the present disclosure, the second display panel 2 may not comprise the second polarizer 24. In addition, the display device of the present embodiment may further comprise a diffusor 4 disposed between the first display panel 3 and the second display panel 2. Herein, the diffusor 4 can prevent moiré generated between the first display panel 3 and the second display panel 2. In addition, the diffusor 4 is not directly adhered to the first display panel 3 and the second display panel 2; and a gap is between the diffusor 4 and the first display panel 3 and another gap is between the diffusor 4 and the second display panel 2 to reduce the border obviousness between two adjacent zones with different luminance during side viewing.

Figure 2:
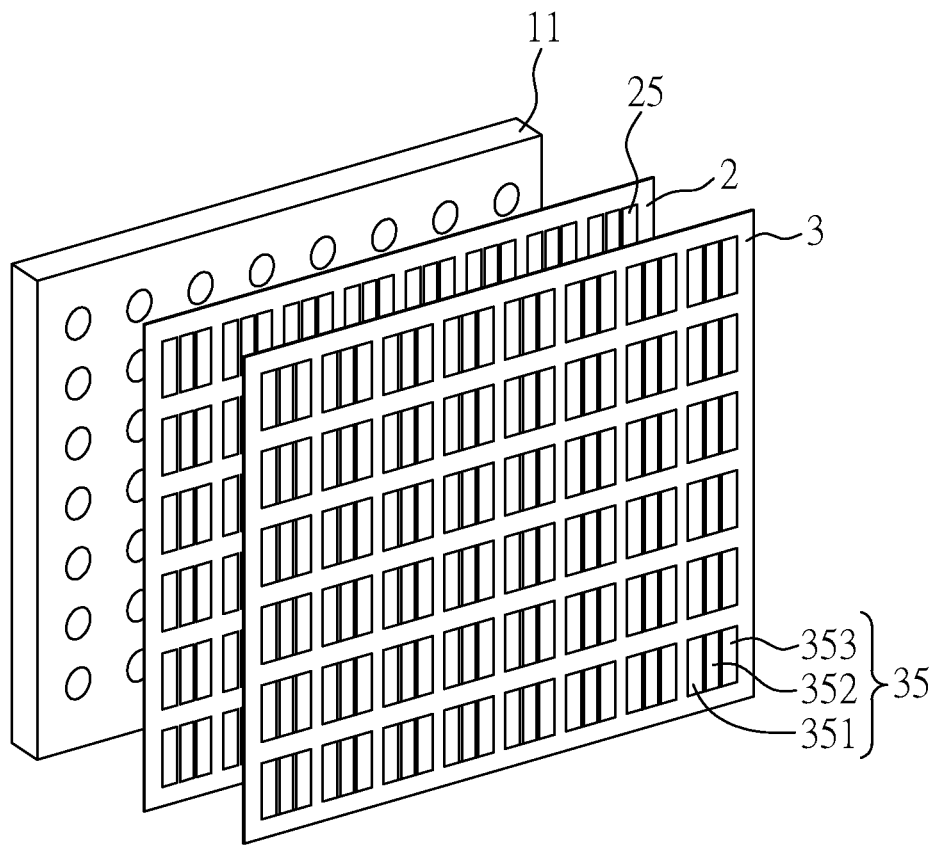
FIG. 2 is a perspective view showing a backlight module, a second display panel and a first display panel in a display device according to one embodiment of the present disclosure.

FIG. 2 is a perspective view showing a backlight module, a second display panel and a first display panel in a display device according to the present embodiment. Herein, in order to clearly show the features of the display device of the present embodiment, some elements shown in FIG. 1 are not shown in FIG. 2.

As shown in FIG. 2, in the display device of the present embodiment, the first display panel 3 comprises plural sub-pixels. More specifically, in the present embodiment, the first display panel 3 comprises plural pixels 35, and each pixel 35 comprises three sub-pixels 351, 352, 353, in which these three sub-pixels 351, 352, 353 are respectively red, green and blue sub-pixels. However, the present disclosure is not limited thereto. In other embodiments of the present disclosure, the number of the sub-pixels comprised in each pixel 35 is not limited to three. For example, each pixel 35 may comprise four sub-pixels. When the pixel 35 comprises four sub-pixels, each pixel 35 may comprise red, green, blue and yellow sub-pixels, or each pixel 35 may comprise red, green, blue and white sub-pixels. However, the present disclosure is not limited thereto. In addition, in other embodiments of the present disclosure, the arrangement of the sub-pixels 351, 352, 353 are not limited to the arrangement shown in FIG. 2.

In the display device of the present embodiment, the second display panel 2 may comprise plural monochromatic gray-scale pixels 25. Herein, the arrangement of the monochromatic gray-scale pixels 25 is the same as the arrangement of the sub-pixels 351, 352, 353. However, the present disclosure is not limited thereto. The arrangement of the monochromatic gray-scale pixels 25 can be identical to or different from the arrangement of the sub-pixels 351, 352, 353. In addition, an area of one of the monochromatic gray-scale pixels 25 can be larger than or equal to an area of one of the sub-pixels 351, 352, 353.

Figure 3:
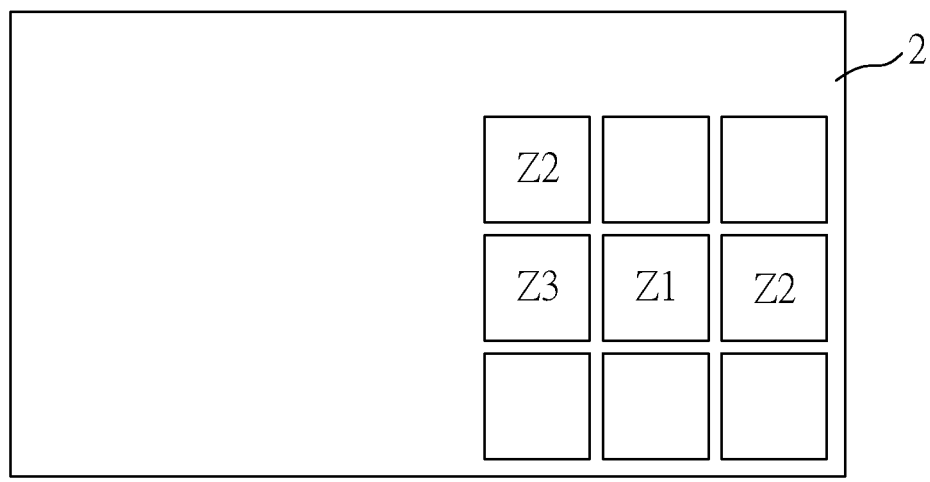
FIG. 3 is a perspective view showing zones in a second display panel according to one embodiment of the present disclosure.

FIG. 3 is a perspective view showing zones in a second display panel according to the present embodiment. As shown in FIG. 2 and FIG. 3, the second display panel 2 can be divided into several zones, for example, a first zone Z1, a second zone Z2 and a third zone Z3; and each zone may comprise plural monochromatic gray-scale pixels 25. It should be noted that, only parts of zones in the monochromatic gray-scale display panel (as the second display panel) are shown in FIG. 3; but the zones comprised in the monochromatic gray-scale display panel are not limited to the nine zones shown in FIG. 3, as long as the sizes of the divided zones in the monochromatic gray-scale display panel are within pixel scales.

In the present embodiment, the first zone Z1 is considered as a central zone to illustrate how to solve the problem of the border obviousness between two adjacent zones with different luminance during side viewing by using the monochromatic gray-scale display panel. Herein, the zones adjacent to the edges of the first zone Z1 or the zones adjacent to the vertexes of the first zone Z1 are considered as adjacent zones. Hence, the eight zones surrounding the first zone Z1 are considered as the zones adjacent to the first zone Z1, as shown in FIG. 3.

Figure 4:
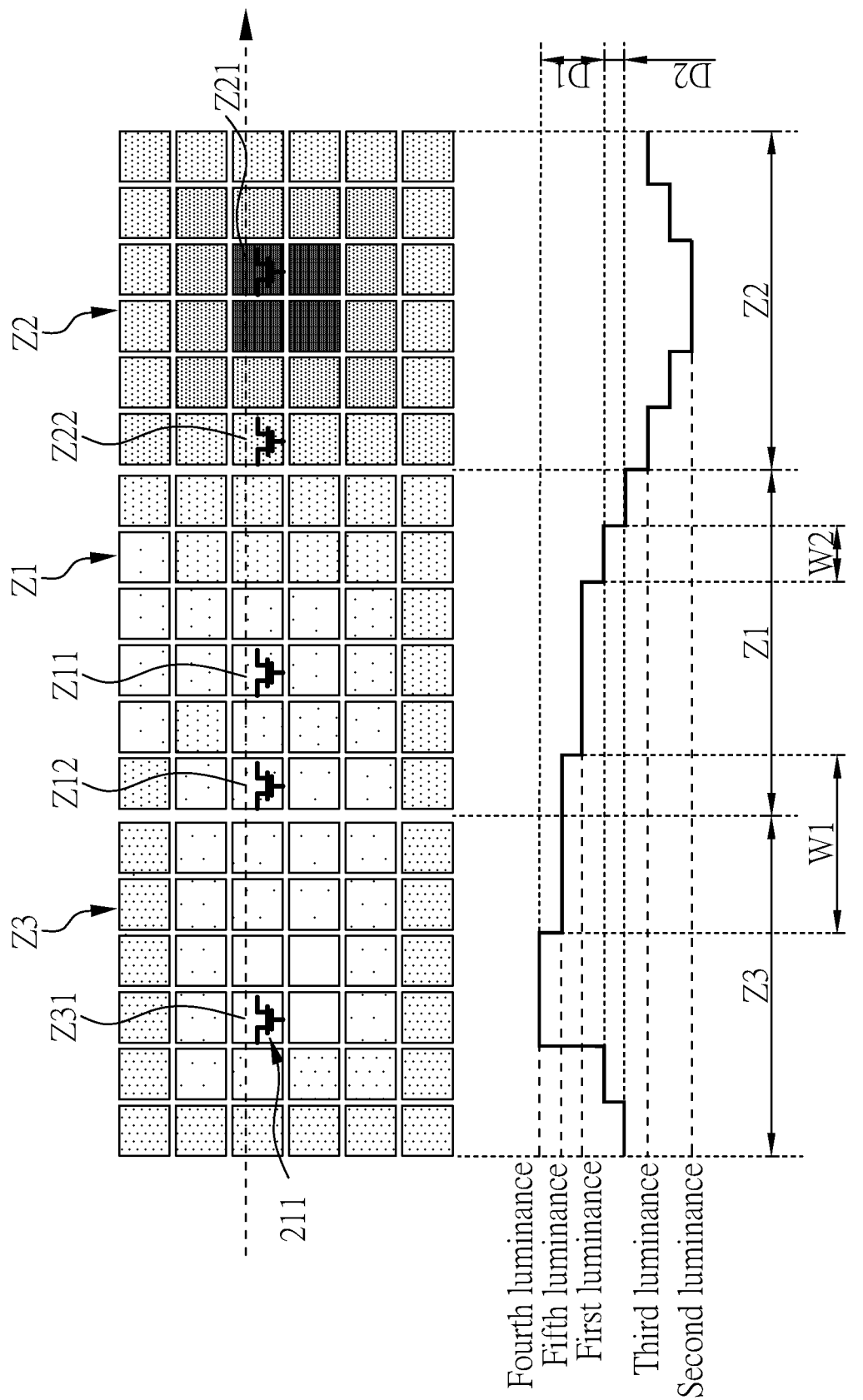
FIG. 4 is a schematic view showing the luminance of three adjacent zones in a second display panel according to one embodiment of the present disclosure.

FIG. 4 is a schematic view showing luminance of three adjacent zones in a second display panel according to the present embodiment. As shown in FIG. 3 and FIG. 4, the second display panel of the present embodiment comprises a first zone Z1 and a second zone Z2, and the second zone Z2 is adjacent to the first zone Z1.

In the display device of the present disclosure, the first zone Z1 comprises a first sub-zone Z11, the second zone Z2 comprises a second sub-zone Z21 and a third sub-zone Z22, and the third sub-zone Z22 is disposed between the first sub-zone Z11 and the second sub-zone Z21. Herein, the first sub-zone Z11, the second sub-zone Z21 and the third sub-zone Z22 respectively correspond to one of the monochromatic gray-scale pixels 25 shown in FIG. 2. However, the present disclosure is not limited thereto.

As shown in FIG. 4, in the present embodiment, the first sub-zone Z11 has a first luminance, the second sub-zone Z21 has a second luminance, and the third sub-zone Z22 has a third luminance. The first luminance, the second luminance and the third luminance are different, and the third luminance is between the first luminance and the second luminance. In the present embodiment, the first luminance of the first sub-zone Z11 is greater than the second luminance of the second sub-zone Z21, but the present disclosure is not limited thereto. In other embodiments of the present disclosure, the first luminance of the first sub-zone Z11 may be less than the second luminance of the second sub-zone Z21. In addition, a difference between the third luminance of the third sub-zone Z22 and the first luminance of the first sub-zone Z11 can be identical to or different from a difference between the third luminance of the third sub-zone Z22 and the second luminance of the second sub-zone Z21. In the present embodiment, a difference between the third luminance of the third sub-zone Z22 and the first luminance of the first sub-zone Z11 is different from a difference between the third luminance of the third sub-zone Z22 and the second luminance of the second sub-zone Z21.

In the conventional monochromatic gray-scale display panel, the first zone Z1 and the second zone Z2 have only one single luminance. In other words, as shown in FIG. 4 as an example, in the conventional monochromatic gray-scale display panel, the first zone Z1 has only one single maximum luminance, and the second zone Z2 has only one single minimum luminance. Hence, when an user view the display device from the side thereof, the luminance difference between the first zone Z1 and the second zone Z2 can be easily observed, and the problem of the border obviousness between the first zone Z1 and the second zone Z2 may be occurred.

However, in the present embodiment, the third luminance of the third sub-zone Z22 disposed between the first sub-zone Z11 and the second sub-zone Z21 are designed to be between the first luminance of the first sub-zone Z11 and the second luminance of the second sub-zone Z21. Thus, when an user watches the display device from the side thereof, the luminance difference between the first zone Z1 and the second zone Z2 cannot be easily observed, and thus the problem of the border obviousness between the first zone Z1 and the second zone Z2 can be improved.

In addition, because the problem of the border obviousness caused by the luminance difference between the first zone Z1 and the second zone Z2 can be improved in the display device of the present embodiment, the diffusor 4 (as shown in FIG. 1) with different haze can be used in the display device of the present embodiment. For example, a diffusor 4 with high haze (for example, the haze of the upper diffusing layer is 30-40%, and the haze of the bottom diffusing layer is around 90%) can be used to solve the problem of border obviousness between adjacent zones. However, in order to prevent the overall brightness of the display device decreased, the average brightness of the backlight module has to be increased. Hence, the haze of the diffusor and the brightness of the backlight module can be adjusted according to user's requirement. Furthermore, the gaps between the diffusor 4 and the first display panel 3 and between the diffusor 4 and the second display panel can also be reduced to reduce the overall thickness of the display device.

Figure 5:
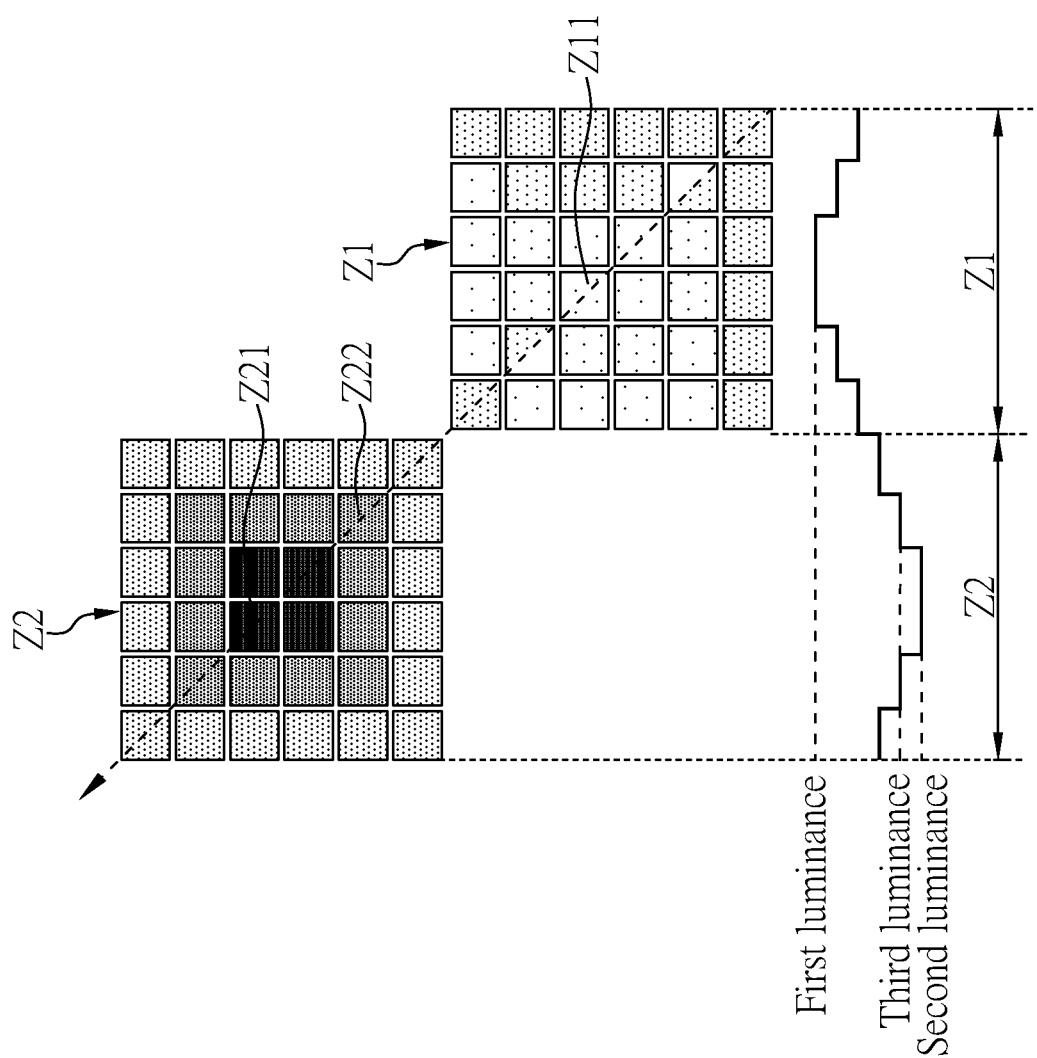
FIG. 5 is a perspective view showing the luminance of another two adjacent zones in a second display panel according to one embodiment of the present disclosure.

In FIG. 4, the first zone Z1 and the second Z2 are adjoined by their sides. However, the first zone Z1 and the second Z2 can also be adjoined by their vertexes, as shown in FIG. 5. In FIG. 5, the luminance distribution of the first zone Z1 and the second Z2 is similar to that shown in FIG. 4, and is not repeatedly explained.

In addition, as shown in FIG. 3 and FIG. 4, the second display panel of the present embodiment may further comprise: a third zone Z3 adjacent to the first zone Z1. The third zone Z3 comprises a fourth sub-zone Z31, the first zone Z1 further comprises a fifth sub-zone Z12, and the fifth sub-zone Z12 is disposed between the fourth sub-zone Z31 and the first sub-zone Z11. The fourth sub-zone Z31 has a fourth luminance, the fifth sub-zone Z12 has a fifth luminance, the first luminance of the first sub-zone Z11, the fourth luminance of the fourth sub-zone Z31 and the fifth luminance of the fifth sub-zone Z12 are different, and the fifth luminance is between the first luminance and the fourth luminance. In the present embodiment, the first luminance of the first sub-zone Z11 is less than the fourth luminance of the fourth sub-zone Z31, but the present disclosure is not limited thereto. In other embodiments of the present disclosure, the first luminance of the first sub-zone Z11 may be greater than the fourth luminance of the fourth sub-zone Z31.

Herein, the first luminance of the first sub-zone Z11 is progressively reduced to the second luminance of the second sub-zone Z21 with the same declined gradient, and the first luminance of the first sub-zone Z11 is progressively increased to the fourth luminance of the fourth sub-zone Z31 with the same increased gradient. However, the present disclosure is not limited thereto. In another embodiment of the present disclosure, the luminance can be increased or decreased by at least two increased gradient or declined gradient for example, as shown in the luminance decrease of the third zone Z3 in FIG. 4. In addition, in other embodiments of the present disclosure, the luminance can be increased or decreased by the same interval or by different intervals. Furthermore, in other embodiments of the present disclosure, from the luminance graph, the luminance can be stepped progressively increased or decreased by the same or different widths or by the same or different heights, as shown in D1, D2, W1 and W2 in FIG. 4.

Figure 6:
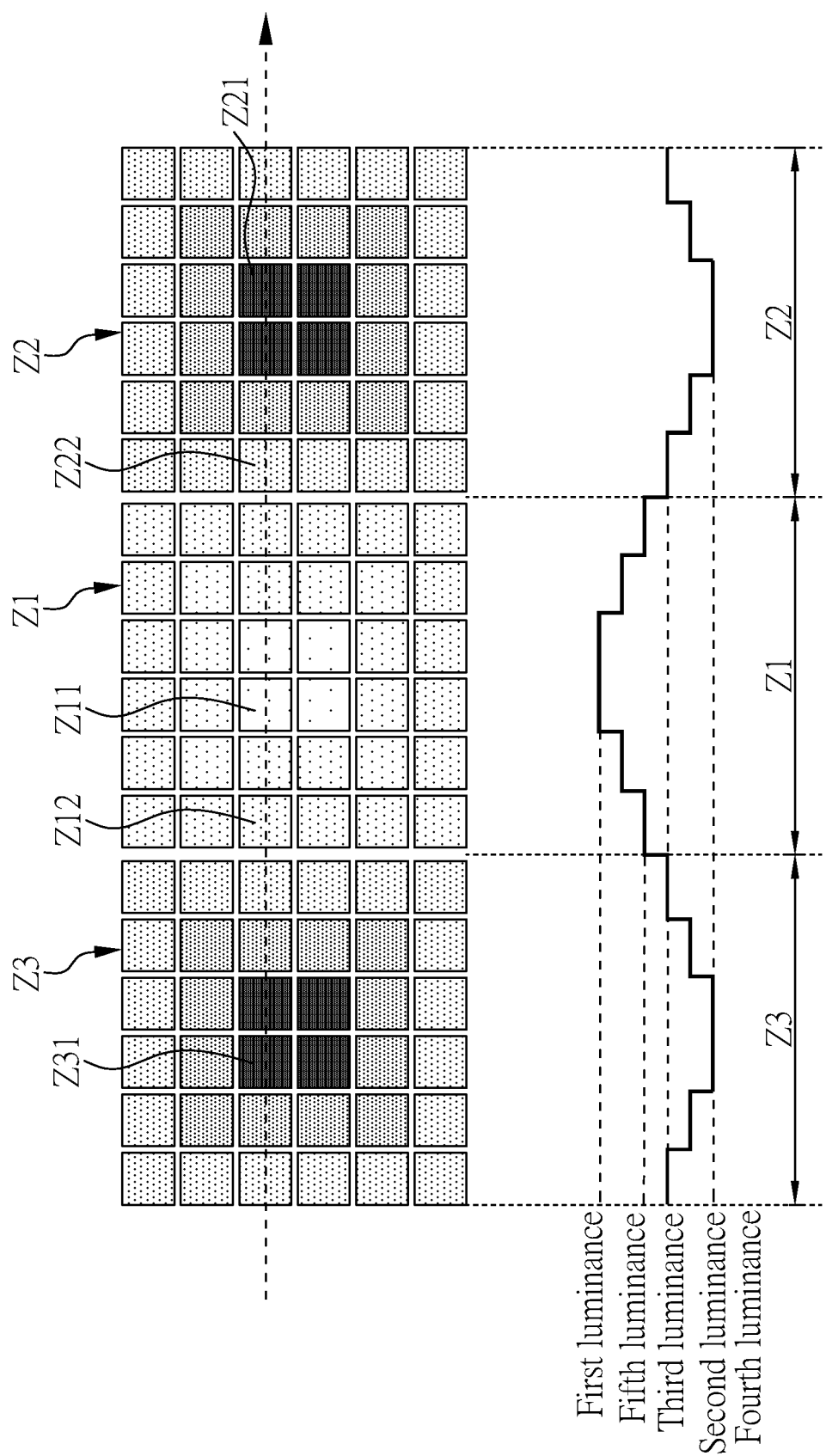
FIG. 6 is a schematic view showing the luminance of three adjacent zones in a second display panel according to another embodiment of the present disclosure.

FIG. 6 is a schematic view showing the luminance of three adjacent zones in a second display panel according to another embodiment of the present disclosure. The present embodiment is similar to the aforesaid embodiment, except for the luminance change of the first zone Z1, the second zone Z2 and the third zone Z3. As shown in FIG. 4, the first luminance of the first sub-zone Z11 is greater than the second luminance of the second sub-zone Z21, and the first luminance of the first sub-zone Z11 is less than the fourth luminance of the fourth sub-zone Z31. In the present embodiment, as shown in FIG. 6, the first luminance of the first sub-zone Z11 is greater than the second luminance of the second sub-zone Z21, and the first luminance of the first sub-zone Z11 is also greater than the fourth luminance of the fourth sub-zone Z31. In addition, the fourth luminance is equal to the second luminance in FIG. 6s, but the present disclosure is not limited thereto.

Figure 7:
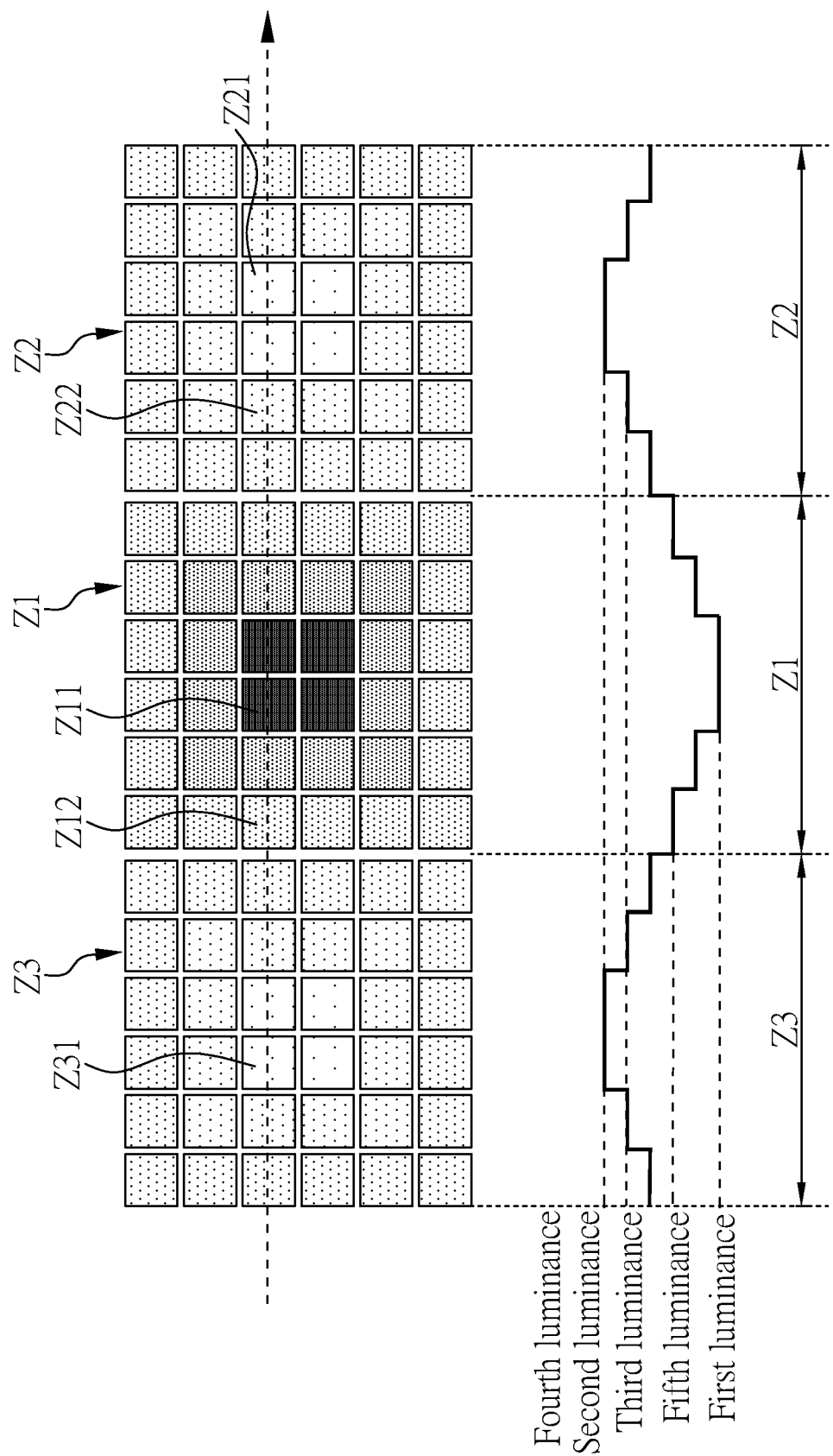
FIG. 7 is a schematic view showing the luminance of three adjacent zones in a second display panel according to another embodiment of the present disclosure.

FIG. 7 is a schematic view showing the luminance of three adjacent zones in a second display panel according to another embodiment of the present disclosure. The present embodiment is similar to the aforesaid embodiment, except for the luminance change of the first zone Z1, the second zone Z2 and the third zone Z3. As shown in FIG. 4, the first luminance of the first sub-zone Z11 is greater than the second luminance of the second sub-zone Z21, and the first luminance of the first sub-zone Z11 is less than the fourth luminance of the fourth sub-zone Z31. In the present embodiment, as shown in FIG. 7, the first luminance of the first sub-zone Z11 is less than the second luminance of the second sub-zone Z21, and the first luminance of the first sub-zone Z11 is also less than the fourth luminance of the fourth sub-zone Z31. In addition, the fourth luminance is equal to the second luminance in FIG. 7, but the present disclosure is not limited thereto.

It should be noted that, the aforesaid luminance increase or decrease are only applied to the situation when the luminance of the first zone Z1, the second zone Z2 and the third zone Z3 is different. In other regions of the display device, the aforesaid progressive luminance increase or decrease does not applied if no luminance difference is presented between adjacent zones.

Furthermore, in FIG. 3 to FIG. 7, the areas of the first zone Z1, the second zone Z2 and the third zone Z3 are the same in the display device of the present embodiment. However, in other embodiments of the present disclosure, the areas of the first zone Z1, the second zone Z2 and the third zone Z3 can be the same or different according to the image displayed on the display device.

In addition, in FIG. 3 to FIG. 7, in the display device of the present embodiment, areas of all the sub-zones in the first zone Z1 (for example, the first sub-zone Z11 and the fifth sub-zone Z12) are the same, areas of all the sub-zones in the second zone Z2 (for example, the second sub-zone Z21 and the third sub-zone Z22) are the same, and areas of all the sub-zones in the third zone Z3 (for example, the fourth sub-zone Z31) are the same. However, the present disclosure is not limited thereto. In other embodiments of the present disclosure, areas of any two of the sub-zones in the first zone Z1 (for example, the first sub-zone Z11 and the fifth sub-zone Z12) can be the same or different, areas of any two of the sub-zones in the second zone Z2 (for example, the second sub-zone Z21 and the third sub-zone Z22) can be the same or different, or areas of any two of the sub-zones in the third zone Z3 (for example, the fourth sub-zone Z31) can be the same or different.

Figure 8:
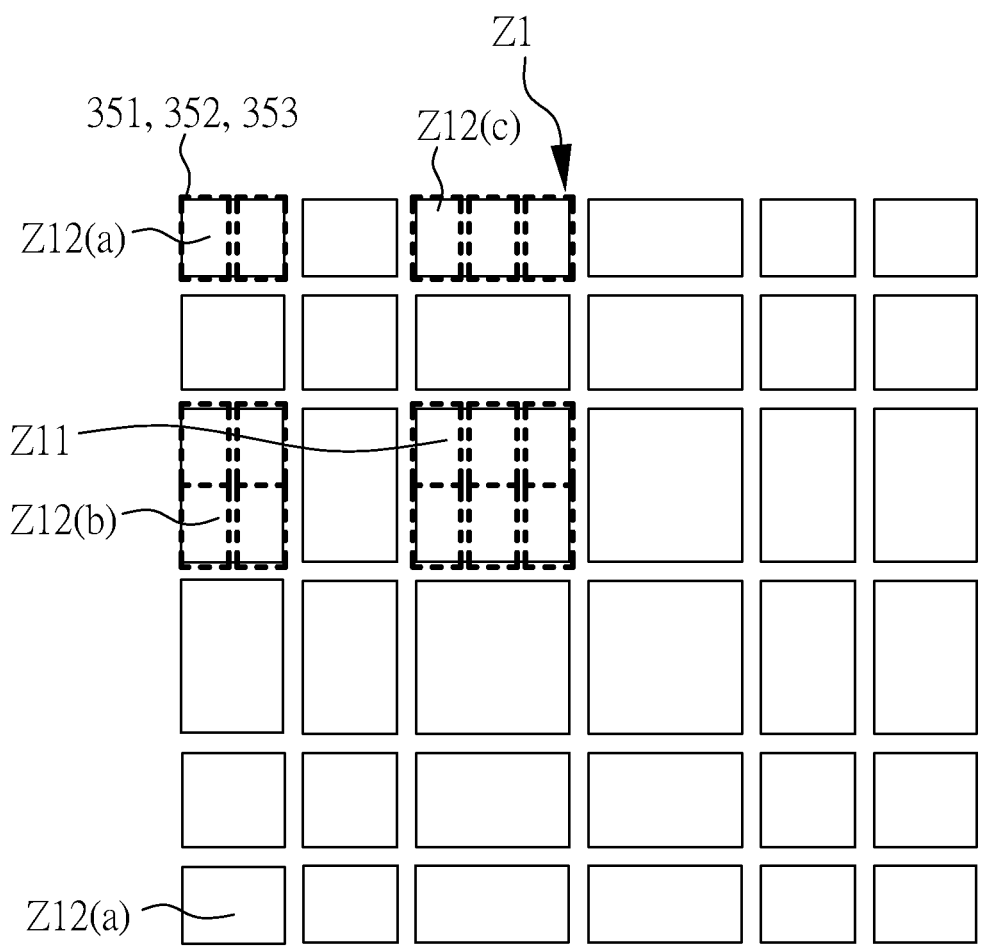
FIG. 8 is a schematic view showing a first zone in a second display panel according to another embodiment of the present disclosure.

FIG. 8 is a schematic view showing a first zone in a second display panel according to another embodiment of the present disclosure. Areas of two of the sub-zones such as the fifth sub-zone Z12(a) are the same, but areas of the other two sub-zones such as the fifth sub-zone Z12(a), the fifth sub-zone Z12(b) and the fifth sub-zone Z12(c) are different. The areas of the sub-zones in the second Z2 and the third zone Z2 can also be designed to have the pattern shown in FIG. 8, and are not repeatedly explained.

In addition, FIG. 2 shows the situation that the areas of the monochromatic gray-scale pixels 25 are the same as the areas of the sub-pixels 351, 352, 353, and each monochromatic gray-scale pixel 25 corresponds to one of the sub-pixels 351, 352, 353. FIG. 4 to FIG. 7 shows the situation that each of the first sub-zone Z11, the second sub-zone Z21, the third sub-zone Z22, the fourth sub-zone Z31 and the fifth sub-zone Z12 respectively corresponds to one monochromatic gray-scale pixel 25 and one sub-pixel 351, 352, 353 shown in FIG. 2; thus, the areas of the first sub-zone Z11, the second sub-zone Z21, the third sub-zone Z22, the fourth sub-zone Z31 and the fifth sub-zone Z12 are the same as the areas of the sub-pixels 351, 352, 353. However, the present disclosure is not limited thereto, as long as at least one of the first sub-zone Z11, the second sub-zone Z21, the third sub-zone Z22, the fourth sub-zone Z31 and the fifth sub-zone Z12 can correspond to at least one of the sub-pixels 351, 352, 353. For example, as shown in FIG. 8, the fifth sub-zone Z12(a) corresponds to two sub-pixels 351, 352, 353 as indicated by dashed line rectangle, the fifth sub-zone Z12(b) corresponds to four sub-pixels 351, 352, 353 as indicated by dashed line rectangle, the fifth sub-zone Z12(c) corresponds to three sub-pixels 351, 352, 353 as indicated by dashed line rectangle, and the first sub-zone Z11 corresponds to six sub-pixels 351, 352, 353 as indicated by dashed line rectangle. Hence, the areas of the fifth sub-zones Z12(a), Z12(b), Z12(c) and the first sub-zone Z11 are larger than the areas of the sub-pixels 351, 352, 353. Herein, only the first zone of the display device is illustrated. Other regions of the display device may have the same design illustrated above, so the description thereof is not repeatedly explained.

As shown in FIG. 3 to FIG. 7, in the display device of the present embodiment, the sub-zones comprised in the first zone Z1 (for example, the first sub-zone Z11 and the fifth sub-zone Z12), the sub-zones comprised in the second zone Z2 (for example, the second sub-zone Z21 and the third sub-zone Z22) and the sub-zones comprised in the third zone Z3 (for example, the fourth sub-zone Z31) are arranged in a 6×6 array; but the present disclosure is not limited thereto. In other embodiments of the present disclosure, the sub-zones comprised in the first zone Z1 (for example, the first sub-zone Z11 and the fifth sub-zone Z12) can be arranged in an n11×n12 array, the sub-zones comprised in the second zone Z2 (for example, the second sub-zone Z21 and the third sub-zone Z22) can be arranged in an n21×n22 array, and the sub-zones comprised in the third zone Z3 (for example, the fourth sub-zone Z31) can be arranged in an n31×n32, wherein n11, n12, n21, n22, n31 and n32 are all integers larger than or equal to 2. For example, n11, n12, n21, n22, n31 and n32 are integers larger than or equal to 2 and smaller than or equal to 128 (2≤n11, n12, n21, n22, n31 or n32≤128). Herein, n11, n12, n21, n22, n31 and n32 can be adjusted according to the thickness of the substrates used in the first display panel 3 and the second display panel 2. n11, n12, n21, n22, n31 and n32 are increased as the thickness of the substrates used in the first display panel 3 and the second display panel 2 increased, and n11, n12, n21, n22, n31 and n32 are decreased as the thickness of the substrates used in the first display panel 3 and the second display panel 2 reduced. In addition, n11 and n12 can be the same or different. In the present embodiment, n11 and n12 are the same. Similarly, n21 and n22 can be the same or different. In the present embodiment, n21 and n22 are the same. Similarly, n31 and n32 can be the same or different. In the present embodiment, n31 and n32 are the same.

In addition, in the aforesaid embodiment of the present disclosure, the second display panel further comprises plural transistors (TFT) 211 disposed on the second bottom substrate 31, and five of the transistors 211 respectively control the first sub-zone Z11, the second sub-zone Z21, the third sub-zone Z22, the fourth sub-zone Z31 and the fifth sub-zone Z12. In addition, even the figure does not show, other sub-zones in the first zone Z1, the second zone Z2 and the third zone Z3 are controlled by different transistors (not shown in the figure). Herein, other transistors used for controlling other sub-zones are not shown in FIG. 4 to simplify the figure.

In the aforesaid embodiments of the present disclosure, the term "sub-zone" (including: first sub-zone Z11, the second sub-zone Z21, the third sub-zone Z22, the fourth sub-zone Z31 and the fifth sub-zone Z12) refers to a region controlled by a transistor, such as an aperture region of the monochromatic gray-scale pixel 25 of the second display panel 2 shown in FIG. 2.

Figure 9:
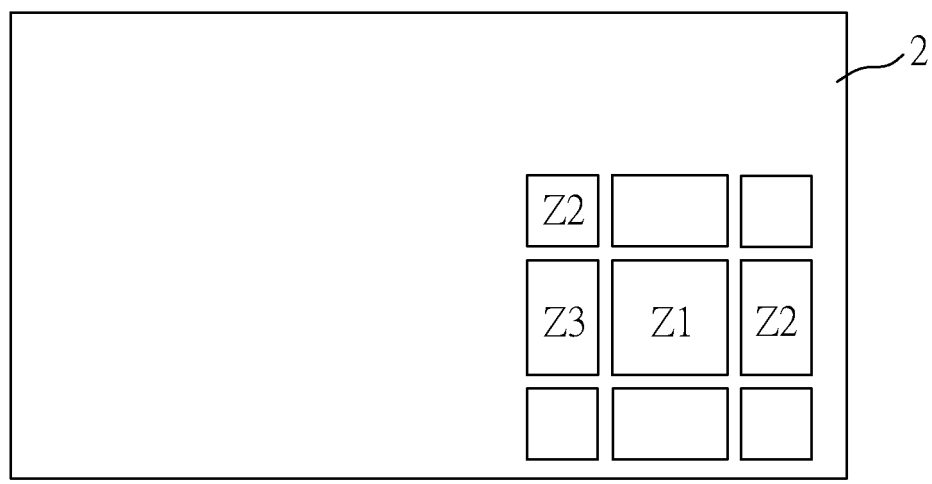
FIG. 9 is a schematic view showing zones in a second display panel according to another embodiment of the present disclosure.

FIG. 9 is a schematic view showing zones in a second display panel according to another embodiment of the present disclosure. The second display panel of the present embodiment is similar to those shown in the aforesaid embodiments, except for the areas of the first zone Z1, the second zone Z2 and the third zone Z3. As shown in FIG. 3, the areas of the first zone Z1, the second zone Z2 and the third zone Z3 are the same. In the present embodiment, as shown in FIG. 9, the areas of the first zone Z1 and the second zone Z2 are different. Similarly, the areas of the first zone Z1 and the third zone Z3 are different, or the areas of the second zone Z2 and the third zone Z3 are different.

Figure 10:
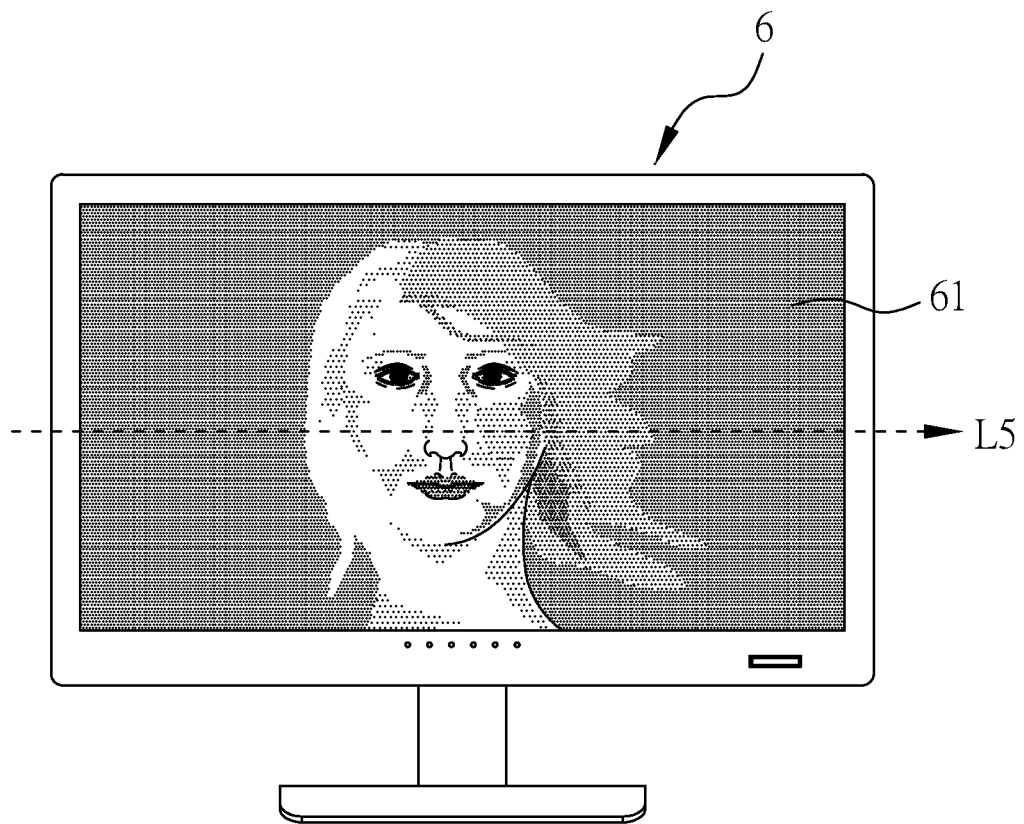
FIG. 10 is a schematic view of a display device according to one embodiment of the present disclosure.
Figure 11:
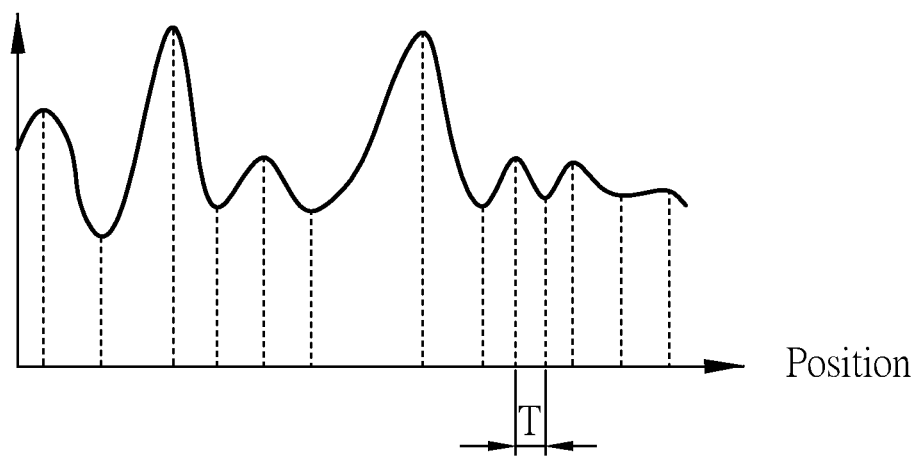
FIG. 11 is a schematic view showing how to define areas of zones in a second display panel.

FIG. 10 is a schematic view of a display device according to one embodiment of the present disclosure, and FIG. 11 is a schematic view showing how to define areas of zones in a second display panel. An image 61 is displayed on the display device 6. The luminance change of any line of the image 61 is analyzed to determine whether the monochromatic gray-scale display panel of the display device uses the zones and sub-zones illustrated in the aforesaid embodiments to achieve the effect of luminance progressive increase or decrease. For example, the luminance change of a part of the line L5 is shown in FIG. 11. The distance between adjacent peak and valley on the luminance chance can be defined as an interval, and the obtained minimum interval T is the size of the zone of the monochromatic gray-scale display panel illustrated in the aforesaid embodiments. For example, the length of the minimum interval T is equal to a total length of six gray-pixels 25 (as shown in FIG. 2), which means one dimension of the first zone comprises 6 sub-zones. However, the present disclosure is not limited thereto.

It should be noted that, in the present disclosure, the luminance of each sub-zones (including: first sub-zone Z11, the second sub-zone Z21, the third sub-zone Z22, the fourth sub-zone Z31 and the fifth sub-zone Z12) can be measured by the following methods. As shown in FIG. 2, the first display panel 3 is separated, the backlight module 1 is lighted, and a test picture is displayed on the second display panel 2, Then, a camera capable of detecting luminance is placed above the second display panel 2 by a proper distance and moved along a horizontal direction. For example, as shown in FIG. 4, the camera is moved from the edge of the fourth sub-zone Z31, and passing the fifth sub-zone Z12, the first sub-zone Z11 and the third sub-zone Z22 to the edge of the second sub-zone Z21. During moving the camera, the luminance is continuously recorded to obtain a position vs luminance graph (for example, as shown in FIG. 11). From this graph, the luminance distribution corresponds to each sub-zones can be obtained. In the present disclosure, the maximum luminance in each sub-zone is considered as the luminance of each sub-zone.

The display device made as described in any of the embodiments of the present disclosure as described previously can be co-used with a touch panel to form a touch display device. Meanwhile, a display device or touch display device may be applied to any electronic devices known in the art that need a display screen, such as displays, mobile phones, laptops, video cameras, still cameras, music players, mobile navigators, TV sets, and other electronic devices that display images.

Although the present disclosure has been explained in relation to its embodiment, it is to be understood that many other possible modifications and variations can be made without departing from the spirit and scope of the disclosure as hereinafter claimed.

What is claimed is:

1. A display device, comprising:
  a backlight module;
  a first display panel disposed on the backlight module; and
  a second display panel disposed between the backlight module and the first display panel, wherein the second display panel comprises a first zone and a second zone adjacent to the first zone, the first zone comprises a first sub-zone, the second zone comprises a second sub-zone and a third sub-zone, and the third sub-zone is disposed between the first sub-zone and the second sub-zone,
  wherein the first sub-zone has a first luminance, the second sub-zone has a second luminance, and the third sub-zone has a third luminance; and
  wherein the first luminance, the second luminance and the third luminance are different, and the third luminance is between the first luminance and the second luminance.

2. The display device of claim 1, further comprising a third zone adjacent to the first zone, wherein the third zone comprises a fourth sub-zone, the first zone further comprises a fifth sub-zone, and the fifth sub-zone is disposed between the fourth sub-zone and the first sub-zone;
  wherein the fourth sub-zone has a fourth luminance, and the fifth sub-zone has a fifth luminance; and
  wherein the first luminance, the fourth luminance and the fifth luminance are different, and the fifth luminance is between the first luminance and the fourth luminance.

3. The display device of claim 2, wherein the first luminance is greater than the second luminance, and the first luminance is greater than the fourth luminance.

4. The display device of claim 2, wherein the first luminance is greater than the second luminance, and the first luminance is less than the fourth luminance.

5. The display device of claim 2, wherein the first luminance is less than the second luminance, and the first luminance is less than the fourth luminance.

6. The display device of claim 1, further comprising a diffusor disposed between the first display panel and the second display panel.

7. The display device of claim 6, wherein a gap is between the diffusor and the first display panel and another gap is between the diffusor and the second display panel.

8. The display device of claim 1, wherein the first display panel comprises plural sub-pixels, and the first sub-zone corresponds to at least one of the plural sub-pixels.

9. The display device of claim 1, wherein the second display panel is a monochromatic gray-scale display panel comprising plural monochromatic gray-scale pixels.

10. The display device of claim 8, wherein the second display panel is a monochromatic gray-scale display panel comprising plural monochromatic gray-scale pixels, and an area of one of the plural monochromatic gray-scale pixel is greater than or equal to an area of one of the plural sub-pixels.

11. The display device of claim 1, wherein an area of the first zone is different from an area of the second zone.

12. The display device of claim 1, wherein an area of the first zone is equal to an area of the second zone.

13. The display device of claim 1, wherein areas of the first sub-zone, the second sub-zone and the third sub-zone are the same.

14. The display device of claim 1, wherein areas of the first sub-zone, the second sub-zone and the third sub-zone are different.

15. The display device of claim 1, wherein a difference between the third luminance and the first luminance is different from a difference between the third luminance and the second luminance.

16. The display device of claim 1, wherein the second display panel further comprises plural transistors, and three of the transistors respectively control the first sub-zone, the second sub-zone and the third sub-zone.

17. The display device of claim 1, wherein the second display panel further comprises: a first polarizer disposed on a side of the second display panel facing to the backlight module; and a second polarizer disposed on a side of the second display panel facing to the first display panel.

18. The display device of claim 1, wherein the first zone comprises plural sub-zones arranged in an $n11{\times}n12$ array, and $n11$ and $n12$ are integers larger than or equal to 2 and smaller than or equal to 128.

19. The display device of claim 1, wherein the second zone comprises plural sub-zones arranged in an $n21{\times}n22$ array, and $n21$ and $n22$ are integers larger than or equal to 2 and smaller than or equal to 128.

20. The display device of claim 2, wherein the third zone comprises plural sub-zones arranged in an $n31{\times}n32$ array, and $n31$ and $n32$ are integers larger than or equal to 2 and smaller than or equal to 128.

* * * * *